United States Patent [19]
Keith

[11] Patent Number: 5,382,041
[45] Date of Patent: Jan. 17, 1995

[54] METHOD AND APPARATUS FOR CONNECTING A TRAILER WITH A RIGID DRAWBAR AND AT LEAST ONE CENTRALLY POSITIONED AXLE TO A TOW VEHICLE

[76] Inventor: Peter G. Keith, 1059 Edgemont Road N.W., Calgary, Alberta, Canada, T3A 2J5

[21] Appl. No.: 105,291

[22] Filed: Aug. 10, 1993

[51] Int. Cl.⁶ .............................................. B62D 13/00
[52] U.S. Cl. .................. 280/476.1; 280/426; 280/442
[58] Field of Search ............... 280/426, 442, 443, 444, 280/446.1, 476.1

[56] References Cited

U.S. PATENT DOCUMENTS

| | | | |
|---|---|---|---|
| 2,092,683 | 9/1937 | Stidham | 280/443 |
| 2,450,215 | 9/1948 | Wilson | 280/443 |
| 2,498,779 | 2/1950 | Winchester | 280/442 |
| 2,523,211 | 9/1950 | Hedgpeth | 280/476.1 |
| 3,814,464 | 6/1974 | Wardill et al. | 280/476.1 |
| 4,262,920 | 4/1981 | Mettetal | 280/408 |
| 4,402,523 | 9/1983 | Knowles | 280/446.1 |
| 4,451,058 | 5/1984 | Curry | 280/423 A |
| 5,037,121 | 8/1991 | Gallatin | 280/426 |

FOREIGN PATENT DOCUMENTS

| | | |
|---|---|---|
| 20065/83 | 4/1984 | Australia . |
| 1289986 | 10/1991 | Canada . |
| 0066269 | 12/1982 | European Pat. Off. . |
| 969695 | 12/1950 | France . |
| 1468997 | 1/1967 | France . |
| 2952405 | 7/1981 | Germany . |
| 3030279 | 2/1982 | Germany . |
| 59-106305 | 6/1984 | Japan . |
| 143547 | 2/1931 | Switzerland . |
| 1049323 | 10/1983 | U.S.S.R. . |

Primary Examiner—Eric D. Culbreth
Assistant Examiner—Victor E. Johnson
Attorney, Agent, or Firm—Davis, Bujold & Streck

[57] ABSTRACT

A method of connecting a trailer with a rigid drawbar and at least one centrally positioned axle to a tow vehicle is described. The method includes the following described steps. Firstly, connect the trailer drawbar to an intermediate hitch support having rotatably mounted ground engaging wheels, such that the hitch weight is borne by the intermediate hitch support. Secondly, pivotally connect an intermediate drawbar to the trailer drawbar for movement about a transverse horizontal axis. Thirdly, connect the intermediate drawbar to a hitch support mounted on a tow vehicle, such that a towing force is transmitted through the intermediate drawbar to the trailer drawbar. Fourthly, couple the tow vehicle and the intermediate hitch support through a pair of spaced apart steering arms. The steering arms have tow vehicle ends and intermediate hitch support ends. The tow vehicle ends are spaced equidistant from an intermediate drawbar hitch point on the tow vehicle hitch support. The intermediate hitch support ends are spaced equidistant from a trailer drawbar hitch point on the intermediate hitch support. As the tow vehicle turns the steering arms cause a proportionate change in the angular positioning of the intermediate hitch support to maintain correct steering geometry. The steering arms are attached to provide for omnidirectional movement thereby accommodating relative changes in attitude between the tow vehicle, the intermediate hitch support and the trailer.

15 Claims, 6 Drawing Sheets

METHOD AND APPARATUS FOR CONNECTING A TRAILER WITH A RIGID DRAWBAR AND AT LEAST ONE CENTRALLY POSITIONED AXLE TO A TOW VEHICLE

The present invention relates to a method of and apparatus for connecting a trailer with a rigid drawbar and at least one centrally positioned axle to a tow vehicle.

BACKGROUND OF THE INVENTION

Conventional trailers come in two basic design configurations. The first, a development of the original two axle horse-drawn cart, has a front axle which pivots about a vertical axis, and a drawbar which is connected to the axle assembly so that the rear of the drawbar pivots about a horizontal transverse axis. The full weight of the trailer is accordingly supported by its front and rear axles and, if the trailer is braked, the only significant hitch loads at the rear of the towing vehicle are those required to pull the trailer. However, the inherent weakness of this design of trailer is that it has two articulation points: one at the hitch point at the rear of the towing vehicle, and the second at the vertical pivot axis of the front axle. Various problems arise from the presence of two articulation points. First, the drawbar tends to jackknife when the vehicle combination is operated in reverse, so that it is impractical to manoeuvre such a trailer in reverse except for short distances in a straight line. Secondly, the drawbar tends to jackknife under emergency braking. Thirdly, the trailer suffers from the phenomenon known as rearward amplification. That is to say, the trailer swings more than the towing vehicle during high speed steering manoeuvres. This is a particular problem when such several trailers are connected together.

The second basic type of trailer has most of its weight supported by one or more centrally positioned axles. The axles are centrally positioned in the sense that they are approximately under the centre of gravity of the trailer. A rigid drawbar, which is usually part of the trailer frame, extends forward and is fitted with a hitch for connection to the rear of the towing vehicle. The advantage of this design is that it has only one articulation point, at the hitch point at the rear of the towing vehicle, and so it is relatively easy to manoeuvre such a trailer in reverse. The disadvantage of this design is that, in order to achieve dynamic stability at highway speeds, a significant portion of the trailer weight has to be supported at the hitch point. This extra weight at the rear of the towing vehicle adversely affects its dynamic stability at highway speeds and can result in overloading of its rear axle unless some type of load-levelling hitch is employed. In addition, the towing vehicle and the trailer are coupled in pitch and yaw (vertical rotation about the vertical axis). As a result pitching motion and trailer swing are immediately transmitted from the trailer to the towing vehicle, which adversely affects both the stability of the towing vehicle and the comfort of its occupants.

SUMMARY OF THE INVENTION

What is required is a method of and apparatus for connecting a trailer with a rigid drawbar and at least one centrally positioned axle to a tow vehicle, which will exhibit improved stability at highway speed.

According to one aspect of the present invention there is provided a method of connecting a trailer with a rigid drawbar and at least one centrally positioned axle to a tow vehicle. The method includes the following described steps. Firstly, connect the trailer drawbar to an intermediate hitch support having rotatably mounted ground engaging wheels, such that the hitch weight is borne by the intermediate hitch support. Secondly, pivotally connect an intermediate drawbar to the trailer drawbar for movement about a transverse horizontal axis. Thirdly, connect the intermediate drawbar to a hitch support mounted on a tow vehicle, such that a towing force is transmitted through the intermediate drawbar to the trailer drawbar. Fourthly, couple the tow vehicle and the intermediate hitch support through a pair of spaced apart steering arms. The steering arms have tow vehicle ends and intermediate hitch support ends. The tow vehicle ends are spaced equidistant from an intermediate drawbar hitch point on the tow vehicle hitch support. The intermediate hitch support ends are spaced equidistant from a trailer drawbar hitch point on the intermediate hitch support. As the tow vehicle turns the steering arms cause a proportionate change in the angular positioning of the intermediate hitch support to maintain correct steering geometry. The means of attachment of the steering arms are capable of omnidirectional movement thereby accommodating relative changes in attitude between the tow vehicle, the intermediate hitch support and the trailer.

It should be noted that with the intermediate hitch support, none of the hitch weight is born by the tow vehicle. It should be noted that the angular positioning of the intermediate hitch support is not significantly effected by relative changes in attitude, such as roll and pitch, between the tow vehicle, the intermediate hitch support and the trailer. When the intermediate hitch support is used, a greater proportion of the trailer weight can be supported by the trailer drawbar hitch, if desired.

According to another aspect of the invention there is provided an apparatus for connecting a trailer with a rigid drawbar and at least one centrally positioned axle to a tow vehicle. The apparatus includes an intermediate hitch support having rotatably mounted ground engaging wheels. The intermediate hitch support has a trailer drawbar hitch point whereby a trailer drawbar is hitched to the intermediate hitch support such that the hitch weight is borne by the intermediate hitch support. An intermediate drawbar is provided which is adapted for pivotal mounting to a trailer drawbar for movement about a transverse horizontal axis. A tow vehicle hitch adaptor bar is provided having an intermediate drawbar hitch point and means for attachment in a substantially transverse horizontal position to a tow vehicle. A pair of spaced apart steering arms are provided which have tow vehicle ends and intermediate hitch support ends. The tow vehicle ends are attached to the tow vehicle hitch adaptor bar and spaced equidistant from the intermediate drawbar hitch point. The intermediate hitch support ends are attached to the intermediate hitch support and spaced equidistant from the trailer drawbar hitch point on the intermediate hitch support. The means of attachment of the steering arms are capable of omnidirectional movement thereby accommodating relative changes in attitude between the tow vehicle, the intermediate hitch support and the trailer.

The apparatus, as described, combines the advantages inherent in having one articulation point with the further advantages inherent in having the hitch weight of the trailer fully supported by the intermediate hitch support rather than by the tow vehicle. Since the trailer is provided with what amounts to a forced-steer front axle, it does not rely upon the tow vehicle for directional stability in yaw. Since the trailer and the tow vehicle are not coupled in pitch the comfort of the occupants of the towing vehicle is further preserved. It is preferred that the intermediate drawbar is generally "V" shaped having spaced apart leg portions attachable to the trailer drawbar. This promotes the strength and stability of the intermediate drawbar and provides design flexibility for the addition of further features as will hereinafter be further described.

Although beneficial results may be obtained through the use of the apparatus, as described, steering geometry must be adjusted to adapt each trailer to the particular tow vehicle with which it is to be towed. This is done through relative spacing of the steering arms in accordance with geometrical relationships which are well known in the art. Even more beneficial results may, therefore, be obtained when the means for attaching the intermediate hitch support ends of the steering arms includes means to adjust the spacing of the intermediate hitch support ends of the steering arms relative to the trailer drawbar hitch point. The same results can be achieved when the means for attaching the tow vehicle ends of the steering arms includes means to adjust the spacing of the tow vehicle ends of the steering arms relative to the intermediate drawbar hitch point.

Although beneficial results may be obtained through the use of the apparatus, as described, the trailer drawbar hitch point is subject to periodic impacts. Even more beneficial results may, therefore, be obtained when the trailer drawbar hitch point is positioned upon a shock absorbing member.

Although beneficial results may be obtained through the use of the apparatus, as described, over-run style hydraulic brake operating mechanisms attached to the forward end of the trailer drawbar are dependent for their operation upon a forward movement of the trailer towards the tow vehicle. Even more beneficial results may, therefore, be obtained when the means for attaching the intermediate drawbar to the trailer includes a transverse horizontal shaft with a pair of radially extending arms, the legs of the intermediate drawbar being attached to the arms, the arms being pivotable about a substantially horizontal axis defined by the transverse horizontal shaft, whereby limited relative forward and rearward movement between the intermediate drawbar and the trailer drawbar is accommodated. By positioning a longitudinal over-run brake activating link between the trailer drawbar hitch point and the intermediate drawbar, an over-run brake is activated upon relative forward and rearward movement between the intermediate drawbar and the trailer drawbar.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 5:
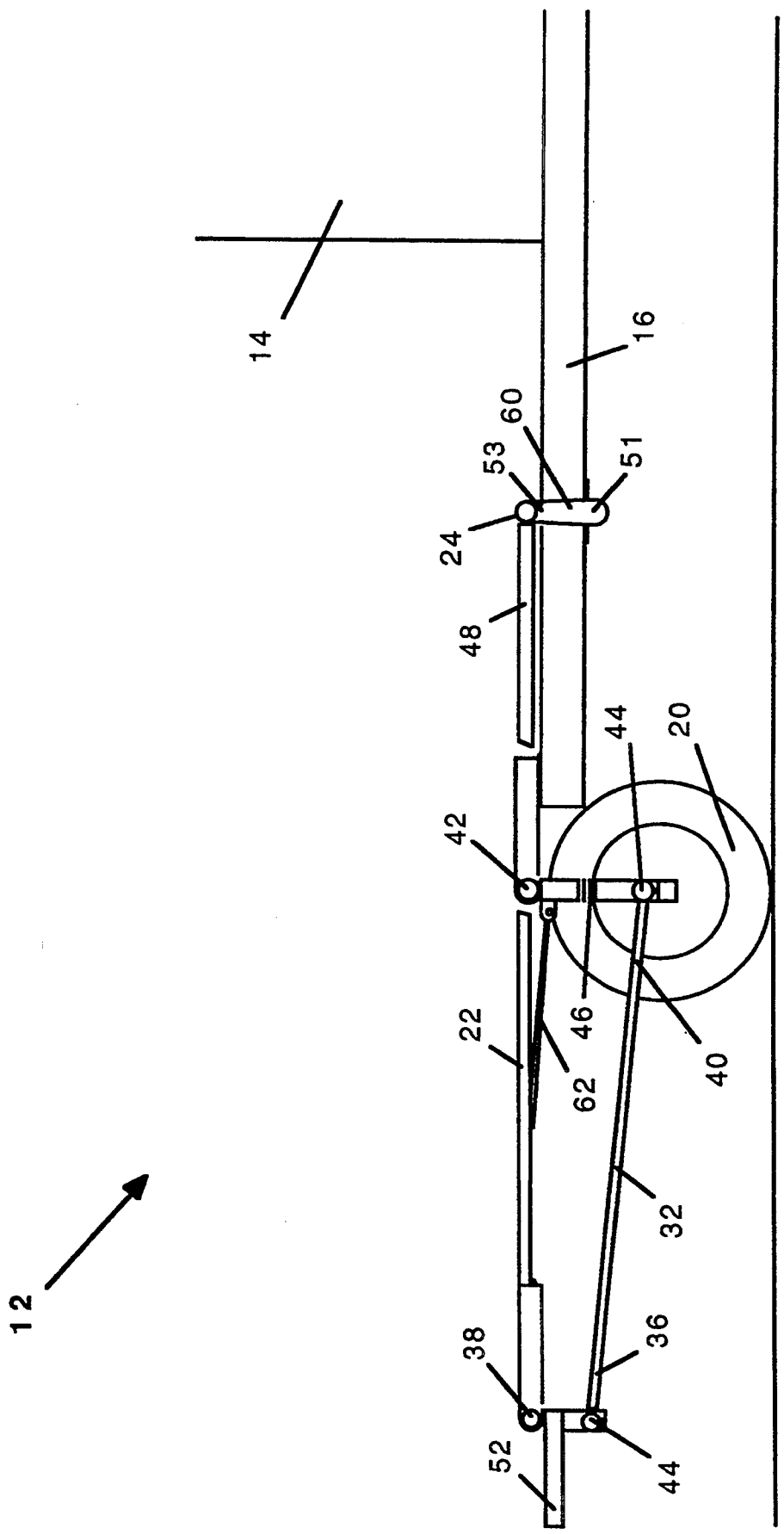
FIG. 5 is a side elevation view of the apparatus illustrated in FIG. 4.
Figure 6:
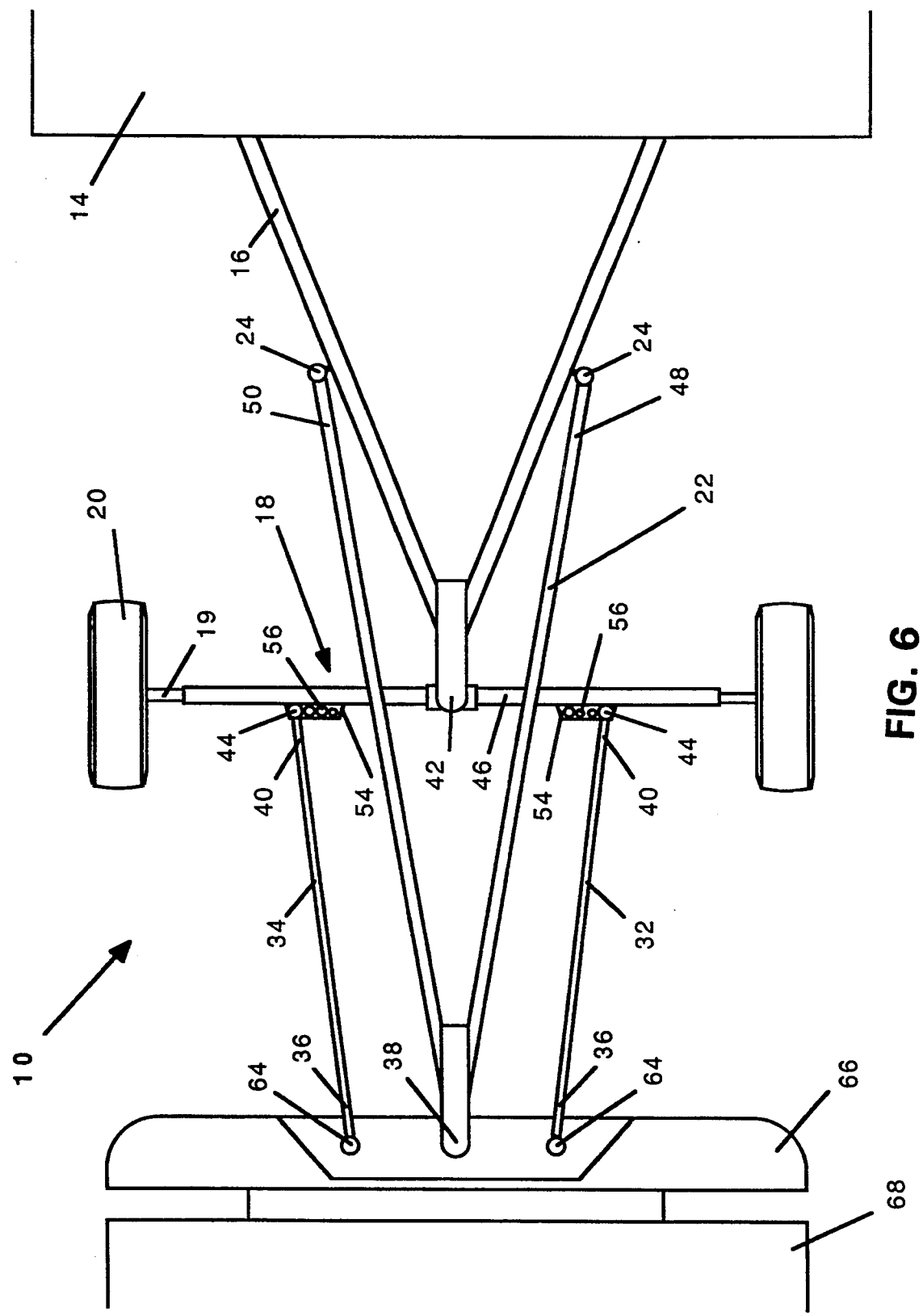
FIG. 6 is a top plan view of an alternative apparatus constructed in accordance with the teachings of the present invention.

There will now be described a method of connecting a trailer with a rigid drawbar and at least one centrally positioned axle to a tow vehicle. Two preferred embodiments will also be described of apparatus constructed in accordance with the teachings of the method. The apparatus are generally identified by reference numerals 10 and 12, respectively. Apparatus 10 will be described with reference to FIGS. 1 through 3. Apparatus 12 has some additional features which will be described with reference to FIGS. 4 and 5. FIG. 6 illustrates an alternative mode of attachment, as will be hereinafter further described.

The method of connecting a trailer 14 with a rigid drawbar 16 and at least one centrally positioned axle (not shown) to a tow vehicle (not shown) includes the following described steps. Firstly, connect trailer drawbar 16 to an intermediate hitch support, generally identified by reference numeral 18, having rotatably mounted ground engaging wheels 20. It can be seen from examining FIGS. 1 through 6 that the hitch weight is borne by intermediate hitch support 18. This relieves the problem of trailer hitch weight adversely affecting the dynamic stability of the tow vehicle. A greater proportion of trailer weight can be transferred to trailer drawbar 16 which is now supported by trailer hitch support 18 as will hereinafter be further described. Secondly, pivotally connect an intermediate drawbar 22 to trailer drawbar 16 for movement about a transverse horizontal axis. In FIG. 2, the transverse horizontal axis is defined by stub shafts 24 which are received in brackets 26 attached to trailer drawbar 16. This attachment could be made permanent through welding, or made detachable through a bracket attachable by bolts. Thirdly, connect intermediate drawbar 22 to a tow vehicle hitch support 30 mounted on the tow vehicle. When connected in accordance with steps two and three a towing force is transmitted from the tow vehicle through intermediate drawbar 22 to trailer drawbar 16. Equally importantly, trailer 14 and the tow vehicle are no longer coupled in pitch, and rotational movement of trailer 14 relative to the tow vehicle is accommodated by pivotal movement about hitch point 38. Directional stability of trailer 14 in yaw is provided by intermediate hitch support 18, which acts as a forced-steer front axle of the trailer. Vertical movement of trailer 14 relative to the tow vehicle (not shown) is accommodated by pivotal movement of intermediate drawbar 22 about the transverse horizontal axis defined by stub shafts 24 and drawbar hitch point 38. The movement of drawbar 22 is also accommodated by other linkages as will be apparent from the description which follows. Fourthly, couple the tow vehicle and intermediate hitch support 18 through a pair of spaced apart steering arms 32 and 34. Steering arms 32 and 34 have tow vehicle ends 36 spaced equidistant from an intermediate drawbar hitch point 38 on tow vehicle hitch support 30, and intermediate hitch support ends 40 spaced equidistant from a trailer drawbar hitch point 42 on intermediate hitch support 18. This couples intermediate hitch support 18 to the tow vehicle such that as the tow vehicle turns steering arms 32 and 34 cause a proportionate change in the angular positioning of intermediate hitch support 18 to maintain correct steering geometry. The means of attachment of ends 36 and 40 of steering arms 32 and 34 must be in the form of ball joints 44 or like means capable of omnidirectional movement to accommodate relative changes in attitude between tow vehicle (not shown), intermediate hitch support 18 and trailer 14. Steering arms 32 and 34 additionally act as "lower control arms" serving to control fore and aft movement of intermediate hitch support 18; locating, as well as steering, axle 19.

Figure 1:
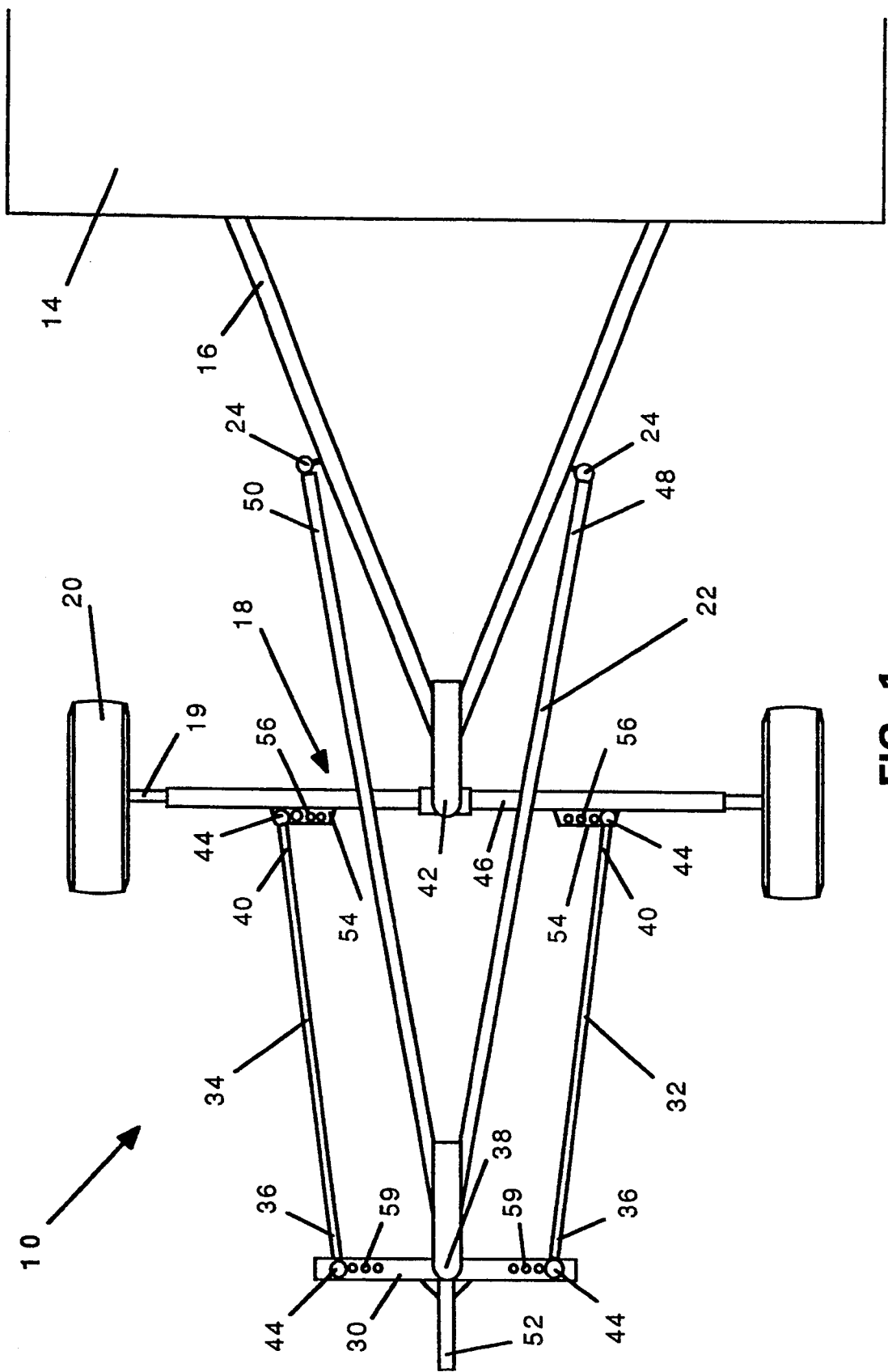
FIG. 1 is a top plan view of an apparatus constructed in accordance with the teachings of the present invention.
Figure 2:
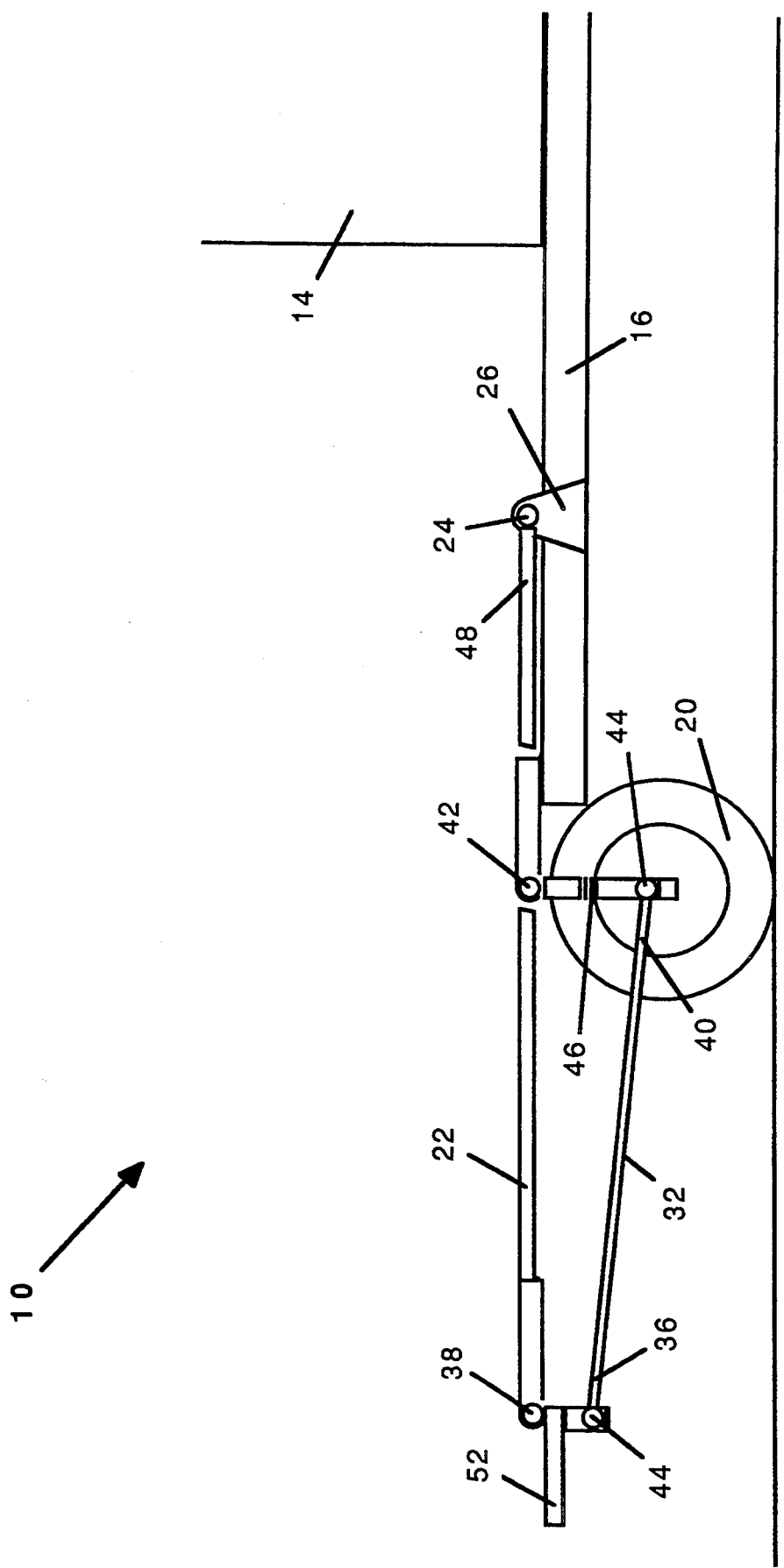
FIG. 2 is a side elevation view of the apparatus illustrated in FIG. 1.
Figure 3:
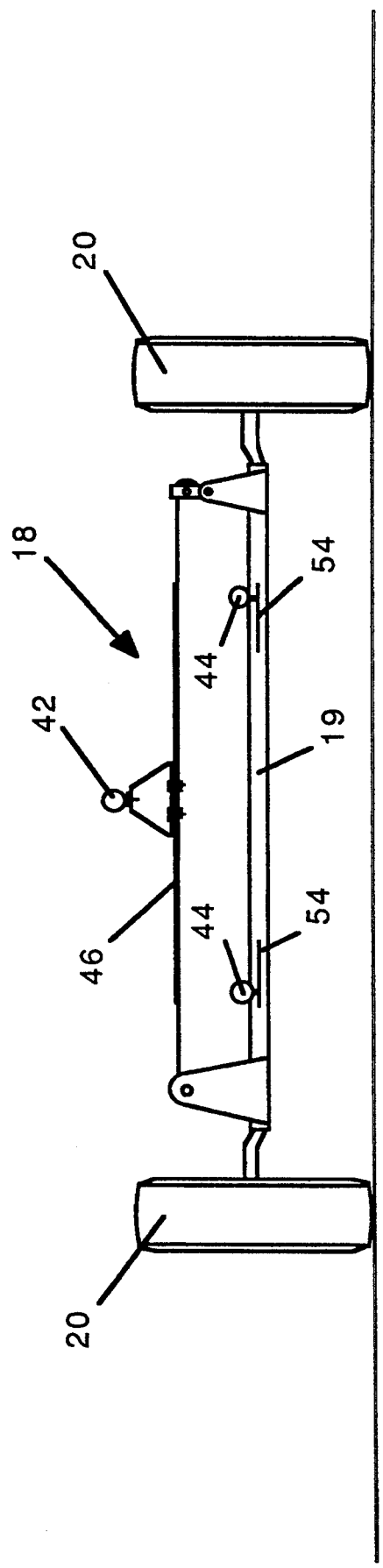
FIG. 3 is a front elevation view of a portion of the apparatus illustrated in FIG. 1.

The teachings of the present method are incorporated in the construction of apparatus 10, as illustrated in FIGS. 1 through 3. In apparatus 10, intermediate hitch support 18 is provided having rotatably mounted ground engaging wheels 20. Intermediate hitch support 18 has trailer drawbar hitch point 42 whereby trailer drawbar 16 is attached to intermediate hitch support 18 such that the hitch weight is borne by intermediate hitch support 18. It is preferred that trailer drawbar hitch point 42 be positioned upon a shock absorbing member such as spring 46. Intermediate drawbar 22 is pivotally mounted to trailer drawbar 16 for movement about a transverse horizontal axis defined by stub shafts 24 which are supported in brackets 26. Intermediate drawbar 22 is generally "V" shaped having spaced apart leg portions 48 and 50. The preferred form of tow vehicle hitch support 30 is a tow vehicle hitch adaptor bar having an intermediate drawbar hitch point 38 and a horizontally projecting attachment tongue 52 whereby adaptor bar 30 is mounted in a substantially transverse horizontal position to the tow vehicle. In accordance with the teachings of the method a pair of spaced apart steering arms 32 and 34 are provided. Steering arms 32 and 34 have tow vehicle ends 36 and intermediate hitch support ends 40. Tow vehicle ends 36 are attached to tow vehicle hitch adaptor bar 30; spaced equidistant from intermediate drawbar hitch point 38. Intermediate hitch support ends 40 are attached to intermediate hitch support 18 and spaced equidistant from trailer drawbar hitch point 42. Ends 36 and 40 of steering arms 32 and 34 are attached by ball joints 44. The ball joints enable limited omnidirectional movement of steering arms 32 and 34 thereby accommodating relative changes in attitude between tow vehicle (not shown), intermediate hitch support 18 and trailer 14. A pair of brackets 54 are provided on intermediate hitch support 18. Each of brackets 54 have a plurality of attachment apertures 56. By selecting a particular pair of attachment apertures 56 the spacing of intermediate hitch support ends 40 of steering arms 32 and 34 are adjusted relative to trailer drawbar hitch point 42 thereby permitting adjustment of steering geometry to suit a particular tow vehicle and trailer combination. The same adjustment of steering geometry to suit a particular tow vehicle and trailer combination can be achieved when the means for attaching tow vehicle ends 36 of steering arms 32 and 34 includes a plurality of attachment apertures 59. By selecting a particular pair of attachment apertures 59 the spacing of tow vehicle ends 36 of steering arms 32 and 34 are adjusted relative to intermediate drawbar hitch point 38 thereby permitting adjustment of steering geometry to suit a particular tow vehicle and trailer combination.

Figure 4:
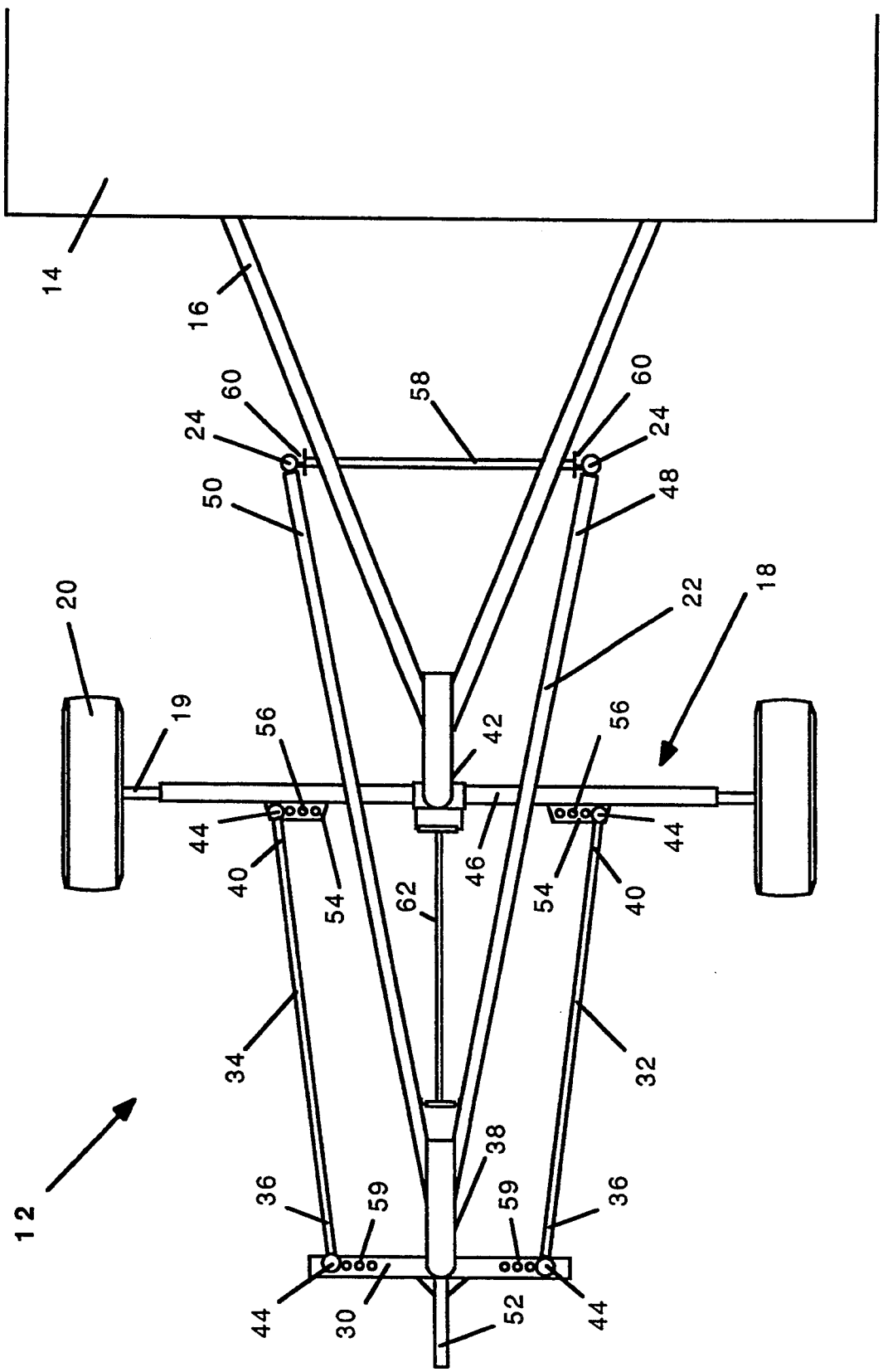
FIG. 4 is a top plan view of an alternative apparatus constructed in accordance with the teachings of the present invention.

Apparatus 12 is similar in construction to apparatus 10, but has added features enabling apparatus 12 to be used with an over-run style of braking mechanism attached to trailer drawbar 16. With the exception of the matters hereinafter described the components of apparatus 12 and apparatus 10 are the same and will be numbered accordingly. Referring to FIGS. 4 and 5, in apparatus 12 intermediate drawbar 22 is attached to trailer 14 by a rotatably mounted transverse horizontal shaft 58. Transverse horizontal shaft 58 is secured to a first end 51 of a pair of radially extending arms 60. Legs 48 and 50 of intermediate drawbar 22 are attached to second end 53 of arms 60. Arms 60 pivot about a substantially horizontal axis defined by transverse horizontal shaft 58 to accommodate a limited relative forward and rearward movement between intermediate drawbar 22 and trailer drawbar 16. A rigid longitudinal over-run brake activating link 62 extends between trailer drawbar hitch point 42 and intermediate drawbar 22. Activating link 62 is adapted to activate an over-run brake activator (not shown) attached to the forward end of trailer drawbar 16 upon relative forward and rearward movement between intermediate drawbar 22 and trailer drawbar 16.

In FIGS. 1 through 5, tow vehicle hitch adaptor bar 30 is illustrated as being the preferred mode of attachment of intermediate drawbar 22 and steering arms 32 and 34 to the tow vehicle. Although tow vehicle hitch adaptor bar 30 is the preferred mode, other modes can be used. For example, in FIG. 6, there is illustrated an embodiment in which ends 36 of steering arms 32 and 34 are attached directly to two ball joint couplings 64 positioned on bumper 66 of tow vehicle 68.

On FIGS. 1 through 6, the numbers 38 and 42 indicate the locations of the intermediate drawbar hitch point and the trailer drawbar hitch point, respectively. In each case, there are typically two mating physical components at the locations indicated. There is a hitch coupling attached to intermediate drawbar 22 and a coupling ball attached to a tow vehicle hitch support 30. Similarly, there is a hitch coupling attached to trailer drawbar 16 and a coupling ball attached to intermediate hitch support 18. It will be apparent to one skilled in the art that modifications may be made to the illustrated embodiments without departing from the spirit and scope of the invention as defined by the claims. In particular, the term "hitch point" must be construed in its broadest sense. There are modifications which may be made to the mode of attachment at the hitch points. The standard ball and hitch coupling normally fitted to the drawbar of a trailer at trailer drawbar hitch point 42 could be replaced by a vertical pivot axis to accommodate steering motion of intermediate hitch support 18 and a transverse pivot axis to accommodate fore and aft movement of intermediate hitch support ends 40 of steering arms 32 and 34. In this manner, intermediate hitch support 18 will provide resistance to roll for trailer 14.

The embodiments of the invention in which an exclusive property or privilege is claimed are as follows:

1. A method of connecting a trailer with a rigid drawbar and at least one centrally positioned axle to a tow vehicle, comprising the following steps:
 a. firstly, connecting the trailer drawbar to an intermediate hitch support having rotatably mounted ground engaging wheels, such that hitch weight is borne by the intermediate hitch support, the intermediate hitch support having an axle that is free to move fore and aft relative to a trailer drawbar hitch point;
b. secondly, pivotally connecting an intermediate drawbar to the trailer drawbar for movement about a transverse horizontal axis;
c. thirdly, connecting the intermediate drawbar to a hitch support mounted on a tow vehicle, such that a towing force is transmitted through the intermediate drawbar to the trailer drawbar; and
d. fourthly, coupling the tow vehicle and the intermediate hitch support through a pair of rigid spaced apart steering arms of fixed length, the steering arms having tow vehicle ends spaced equidistant from an intermediate drawbar hitch point on the tow vehicle hitch support, and intermediate hitch support ends secured adjacent to the axle and spaced equidistant from the trailer drawbar hitch point on the intermediate hitch support, such that as the tow vehicle turns the steering arms cause a proportionate change in the angular positioning of the intermediate hitch support to maintain correct steering geometry, means of attachment of the steering arms being provided which are capable of omnidirectional movement thereby accommodating relative changes in attitude between the tow vehicle, the intermediate hitch support and the trailer; the fore and aft movement of the axle of the intermediate hitch support relative to the trailer drawbar hitch point accommodating simultaneous fore movement and simultaneous aft movement of the intermediate hitch support ends of the steering arms, with the steering arms serving to control the amount of fore movement and aft movement of the axle.

2. The method as defined in claim 1, the intermediate drawbar being generally "V" shaped having spaced apart leg portions attached to the trailer drawbar.

3. The method as defined in claim 1, the means of attachment of the intermediate hitch support ends of the steering arms including means to adjust the spacing of intermediate hitch support ends of the steering arms relative to the trailer drawbar hitch point.

4. The method as defined in claim 1, the means of attachment of the tow vehicle ends of the steering arms including means to adjust the spacing of the tow vehicle ends of the steering arms relative to an intermediate drawbar hitch point.

5. The method as defined in claim 1, the trailer drawbar hitch point being positioned upon a shock absorbing member.

6. The method as defined in claim 2, the intermediate drawbar being attached to the trailer by a transverse horizontal shaft secured to a first end of a pair of radially extending arms, the leg portions of the intermediate drawbar being attached to a second end of the arms, the arms being pivotable about a substantially horizontal axis defined by the transverse horizontal shaft, the arms pivoting with the transverse horizontal shaft in response to simultaneous forward movement and simultaneous rearward movement of the leg portions of the intermediate drawbar whereby a limited relative forward and rearward movement between the intermediate drawbar and the trailer drawbar is accommodated; and a longitudinal over-run brake activating link between the trailer drawbar hitch point and the intermediate drawbar which moves to an activating position upon simultaneous rearward movement of the leg portions of the intermediate drawbar relative to the trailer drawbar hitch point.

7. An apparatus for connecting a trailer with a rigid drawbar and at least one centrally positioned axle to a tow vehicle, comprising;
a. an intermediate hitch support having rotatably mounted ground engaging wheels, the intermediate hitch support having a trailer drawbar hitch point whereby a trailer drawbar is attached to the intermediate hitch support such that hitch weight is borne by the intermediate hitch support, the intermediate hitch support having an axle that is free to move fore and aft relative to the trailer drawbar hitch point;
b. an intermediate drawbar having one end pivotally mounted to a trailer drawbar for movement about a transverse horizontal axis, and an opposed end with means for attachment to a tow vehicle;
c. a pair of spaced apart rigid steering arms of a fixed length, the steering arms having tow vehicle ends and intermediate hitch support ends, the tow vehicle ends having means for attachment to a tow vehicle spaced equidistant from an intermediate drawbar hitch point, the intermediate hitch support ends being attached to the intermediate hitch support adjacent to the axle and spaced equidistant from the trailer drawbar hitch point on the intermediate hitch support, means of attachment of the steering arms being provided which is capable of omnidirectional movement thereby accommodating relative changes in attitude between the tow vehicle, the intermediate hitch support and the trailer, the fore and aft movement of the axle of the intermediate hitch support relative to the trailer drawbar hitch point accommodating simultaneous fore movement and simultaneous aft movement of the intermediate hitch support ends of the steering arms, with the steering arms serving to control the amount of fore movement and aft movement of the axle.

8. The apparatus as defined in claim 7, including a tow vehicle hitch adaptor bar having means for attachment in a substantially transverse horizontal position to the tow vehicle, the tow vehicle hitch adaptor bar having an intermediate drawbar hitch point and steering arm attachment points spaced equidistant from the intermediate drawbar hitch point.

9. The apparatus as defined in claim 7, the intermediate drawbar being generally "V" shaped having spaced apart leg portions attached to the trailer drawbar.

10. The apparatus as defined in claim 7, the means of attachment of the intermediate hitch support ends of the steering arms including means to adjust the spacing of intermediate hitch support ends of the steering arms relative to the trailer drawbar hitch point.

11. The apparatus as defined in claim 7, the means of attachment of the tow vehicle ends of the steering arms including means to adjust the spacing of the tow vehicle ends of the steering arms relative to the intermediate drawbar hitch point.

12. The apparatus as defined in claim 7, the trailer drawbar hitch point being positioned upon a shock absorbing member.

13. The apparatus as defined in claim 9, the intermediate drawbar being attached to the trailer by a transverse horizontal shaft secured to a first end of a pair of radially extending arms, the leg portions of the intermediate drawbar being attached to a second end of the arms, the arms being pivotable about a substantially horizontal axis defined by the transverse horizontal shaft, the arms pivoting with the transverse horizontal shaft in response to simultaneous forward movement and simultaneous rearward movement of the leg portions of the intermediate drawbar whereby a limited relative forward and rearward movement between the intermediate drawbar and the trailer drawbar is accommodated; and a longitudinal over-run brake activating link between the trailer drawbar hitch point and the intermediate drawbar, which moves to an activating position upon simultaneous rearward movement of the leg portions of the intermediate drawbar.

14. An apparatus for connecting a trailer with a rigid drawbar and at least one centrally positioned axle to a tow vehicle, comprising;
 a. an intermediate hitch support having rotatably mounted ground engaging wheels, the intermediate hitch support having a trailer drawbar hitch point whereby a trailer drawbar is attached to the intermediate hitch support such that hitch weight is borne by the intermediate hitch support, the trailer drawbar hitch point being positioned upon a shock absorbing spring member, the intermediate hitch support having an axle that is free to move fore and aft relative to the trailer drawbar hitch point;
 b. an intermediate drawbar pivotally mounted to the trailer drawbar for movement about a transverse horizontal axis, the intermediate drawbar being generally "V" shaped having spaced apart leg portions;
 c. a tow vehicle hitch adaptor bar having an intermediate drawbar hitch point and a horizontally projecting attachment tongue whereby the adaptor bar is mounted in a substantially transverse horizontal position to the tow vehicle; and
 d. a pair of rigid spaced apart steering arms of a fixed length, the steering arms having tow vehicle ends and intermediate hitch support ends, the tow vehicle ends being attached to the tow vehicle hitch adaptor bar and spaced equidistant from an intermediate drawbar hitch point, the intermediate hitch support ends being attached to the intermediate hitch support adjacent to the axle and spaced equidistant from the trailer drawbar hitch point on the intermediate hitch support, the steering arms being attached by ball joints, the ball joints being capable of omnidirectional movement thereby accommodating relative changes in attitude between the tow vehicle, the intermediate hitch support and the trailer, one of the intermediate hitch support and the tow vehicle hitch adaptor bar having a plurality of attachment apertures, such that by selecting a particular pair of attachment apertures the spacing of the ends of the steering arms are adjusted relative to the hitch point thereby permitting adjustment of steering geometry to suit a particular tow vehicle, the fore and aft movement of the axle of the intermediate hitch support relative to the trailer drawbar hitch point accommodating simultaneous fore movement and simultaneous aft movement of the intermediate hitch support ends of the steering arms, with the steering arms serving to control the amount of fore movement and aft movement of the axle.

15. An apparatus for connecting a trailer with a rigid drawbar and at least one centrally positioned axle to a tow vehicle, comprising;
 a. an intermediate hitch support having rotatably mounted ground engaging wheels, the intermediate hitch support having a trailer drawbar hitch point whereby a trailer drawbar is attached to the intermediate hitch support such that hitch weight is borne by the intermediate hitch support, the trailer drawbar hitch point being positioned upon a shock absorbing spring member, the intermediate hitch support having an axle that is free to move fore and aft relative to the trailer drawbar hitch point;
 b. an intermediate drawbar having means for pivotal mounting to the trailer drawbar for movement about a transverse horizontal axis, the intermediate drawbar being generally "V" shaped having spaced apart leg portions, the intermediate drawbar being attached to the trailer by a rotatably mounted transverse horizontal shaft secured to a first end of a pair of radially extending arms, the leg portions of the intermediate drawbar being attached to a second end of the arms, the arms being pivotable about a substantially horizontal axis defined by the transverse horizontal shaft, the arms pivoting with the transverse horizontal shaft in response to simultaneous forward movement and simultaneous rearward movement of the leg portions of the intermediate drawbar whereby a limited relative forward and rearward movement between the intermediate drawbar and the trailer drawbar is accommodated;
 c. a tow vehicle hitch adaptor bar having an intermediate drawbar hitch point and a horizontally projecting attachment tongue whereby the adaptor bar is mounted in a substantially transverse horizontal position to the tow vehicle;
 d. a pair of spaced apart rigid steering arms of a fixed length, the steering arms having tow vehicle ends and intermediate hitch support ends, the tow vehicle ends being attached to the tow vehicle hitch adaptor bar and spaced equidistant from an intermediate drawbar hitch point, the intermediate hitch support ends being attached to the intermediate hitch support adjacent to the axle and spaced equidistant from the trailer drawbar hitch point on the intermediate hitch support, the steering arms being attached by ball joints, the ball joints being capable of omnidirectional movement thereby accommodating relative changes in attitude between the tow vehicle, the intermediate hitch support and the trailer, one of the intermediate hitch support and the tow vehicle hitch adaptor bar having a plurality of attachment apertures, such that by selecting a particular pair of attachment apertures the spacing of the ends of the steering arms are adjusted relative to the hitch point thereby permitting adjustment of steering geometry to suit a particular tow vehicle, the fore and aft movement of the axle of the intermediate hitch support relative to the trailer drawbar hitch point accommodating simultaneous fore movement and simultaneous aft movement of the intermediate hitch support ends of the steering arms, with the steering arms serving to control the amount of fore movement and aft movement of the axle.; and
 e. a rigid longitudinal over-run brake activating link extending between the trailer drawbar hitch point and the intermediate drawbar, the activating link moving to an activating position upon simultaneous rearward movement of the leg portions of the intermediate drawbar relative to the trailer drawbar hitch point.

* * * * *